United States Patent [19]
Boss et al.

[11] Patent Number: 4,871,342
[45] Date of Patent: Oct. 3, 1989

[54] DRIVE-TRAIN TORQUE-TRANSMITTING DISK

[75] Inventors: Franz Boss, Kressbronn; Udo Wolz, Friedrichshafen, both of Fed. Rep. of Germany

[73] Assignee: Zahnradfabrik Friedrichshafen AG, Friedrichshafen, Fed. Rep. of Germany

[21] Appl. No.: 231,886

[22] Filed: Aug. 12, 1988

[30] Foreign Application Priority Data

Aug. 14, 1987 [DE] Fed. Rep. of Germany ....... 3727090

[51] Int. Cl.$^4$ ............................ F16D 3/06; F16D 3/78
[52] U.S. Cl. .................................... 464/98; 192/106.1
[58] Field of Search ................. 192/106.1; 464/98, 99

[56] References Cited

U.S. PATENT DOCUMENTS

| | | | |
|---|---|---|---|
| 1,964,054 | 6/1934 | Harris | 192/106.1 |
| 2,281,898 | 5/1942 | Whitten | 192/106.1 |
| 2,407,757 | 9/1946 | MacCallum | 464/98 X |
| 2,588,668 | 3/1952 | Syrouy | 464/98 X |
| 2,832,906 | 4/1958 | Koons | 464/98 X |
| 2,855,767 | 10/1958 | Ahlen | 464/98 |
| 4,353,444 | 10/1982 | Bionaz | 192/106.1 X |

FOREIGN PATENT DOCUMENTS

| | | |
|---|---|---|
| 1971310 | 10/1967 | Fed. Rep. of Germany . |
| 3222119 | 10/1983 | Fed. Rep. of Germany . |
| 838152 | 6/1981 | U.S.S.R. ................ 464/98 |

*Primary Examiner*—Daniel P. Stodola
*Attorney, Agent, or Firm*—Herbert Dubno; Andrew Wilford

[57] ABSTRACT

A coupling disk is used in an engine with an output element rotatable about an axis and a drive train having an input element rotatable generally about the same axis. The disk has an inner ring of bores by means of which it is bolted to the output element an outer ring of bores by means of which it is bolted to the input element. The disk is formed with a plurality of radially outwardly projecting tabs separated by radially outwardly open cutouts and each formed with a respective one of the outer bores. The cutouts extend radially inward past regions of contact between the tabs and the input element and the tabs are each formed with generally tangentially extending corrugations.

6 Claims, 2 Drawing Sheets

DRIVE-TRAIN TORQUE-TRANSMITTING DISK

FIELD OF THE INVENTION

The present invention relates to a disk used to transmit torque in a drive train. More particularly this invention concerns such a disk used between the engine and the input element of a motor-vehicle drive train.

BACKGROUND OF THE INVENTION

In a motor vehicle the output element of the engine, normally the drive shaft or flywheel, is normally connected to the drive train's input element, normally a side of a clutch or torque converter, by means of a flexible disk whose one periphery is connected to the one element and whose other periphery is connected to the other. This makes it possible for there to be some axial misalignment between the engine and drive train to compensate for thermally caused movements, twisting created by torque loads, and the like, as it is virtually impossible to maintain the engine and drive train perfectly coaxial. The disk must transmit torque with no losses while permitting this axial offset.

Such a disk, as described in German Utility Model 1,971,310, compensates both for axial nonparallelism and even relative axial displacement of the drive-train and engine elements. In this arrangement the disk has circular inner and outer peripheries respectively connected to the engine output element and transmission input element.

In order to compensate for some radial misalignment it has been suggested in German patent 3,222,119 to replace the outer bores with radially extending slots so that some slippage can take place at the connection to the drive-train input element. Such a system has shown itself to be, however, of very short service life due to wear at these outer bores.

OBJECTS OF THE INVENTION

It is therefore an object of the present invention to provide an improved coupling disk for a drive train.

Another object is the provision of such an improved coupling disk which overcomes the above-given disadvantages, that is which surely and accurately transmits torque while permitting relative axial and radial offset of the elements it connects.

A further object is the provision of such a coupling disk which has a long service life.

SUMMARY OF THE INVENTION

The disk according to this invention is used as is known in an engine with an output element rotatable about an axis and a drive train having an input element rotatable generally about the same axis. The disk has an inner ring of bores by means of which it is bolted to the output element and an outer ring of bores by means of which it is bolted to the input element. According to the present invention the disk is formed with a plurality of radially outwardly projecting tabs separated by radially outwardly open cutouts and each formed with a respective one of the outer bores. The cutouts extend radially inward past regions of contact between the tabs and the input element and the tabs are each formed with generally tangentially extending corrugations.

Thus the disk of this invention, which is actually star-shaped with a central aperture and which can actually be laminated from a plurality of identical disk laminae, can compensate for relative axial displacements and axial misalignments of the input and output elements much like the prior-art disks, by flexing of its tabs. In addition it can compensate for relative radial displacements by radial compression and extension of the tab corrugations. There is no slip between the inner and outer peripheries and the respective elements so that the system will have a long service life as all the deformations are well within the elastic limit of the steel from which the disk is normally made.

According to another feature of this invention the tabs taper radially outward and the cutouts taper radially inward and are generally triangular. In addition the corrugations are straight and extend substantially perpendicular to respective radii extending from the axis through the respective outer bores. There are the same number of inner bores as outside bores and the bores are angularly equispaced about the axis.

Furthermore in accordance with this invention the tabs each have a leading flank and a trailing flank relative to a normal direction of rotation of the elements about the axis and each leading flank extends at an angle to a centerline of the respective tab that is different from the angle of the respective trailing flank. Each leading flank forms a substantially greater angle with the respective centerline than the respective trailing flank so that the tabs are generally sawtooth-shaped. Thus the longer leading flank will be stressed in tension while the shorter trailing flank will be stressed in compression. Each trailing flank is sustantially parallel to the respective centerline. Each cutout extends outward from a location generally two-thirds of the distance from a circle on which lie the inner bores to a circle on which lie the outer bores.

It is also possible according to this invention to provide the system with a torque damper braced between the disk and one of the elements. Normally the torque damper is braced between the disk and the output element.

DESCRIPTION OF THE DRAWING

The above and other objects, features, and advantages will become more readily apparent from the following, reference being made to the accompanying drawing in which.

SPECIFIC DESCRIPTION

Figure 1:
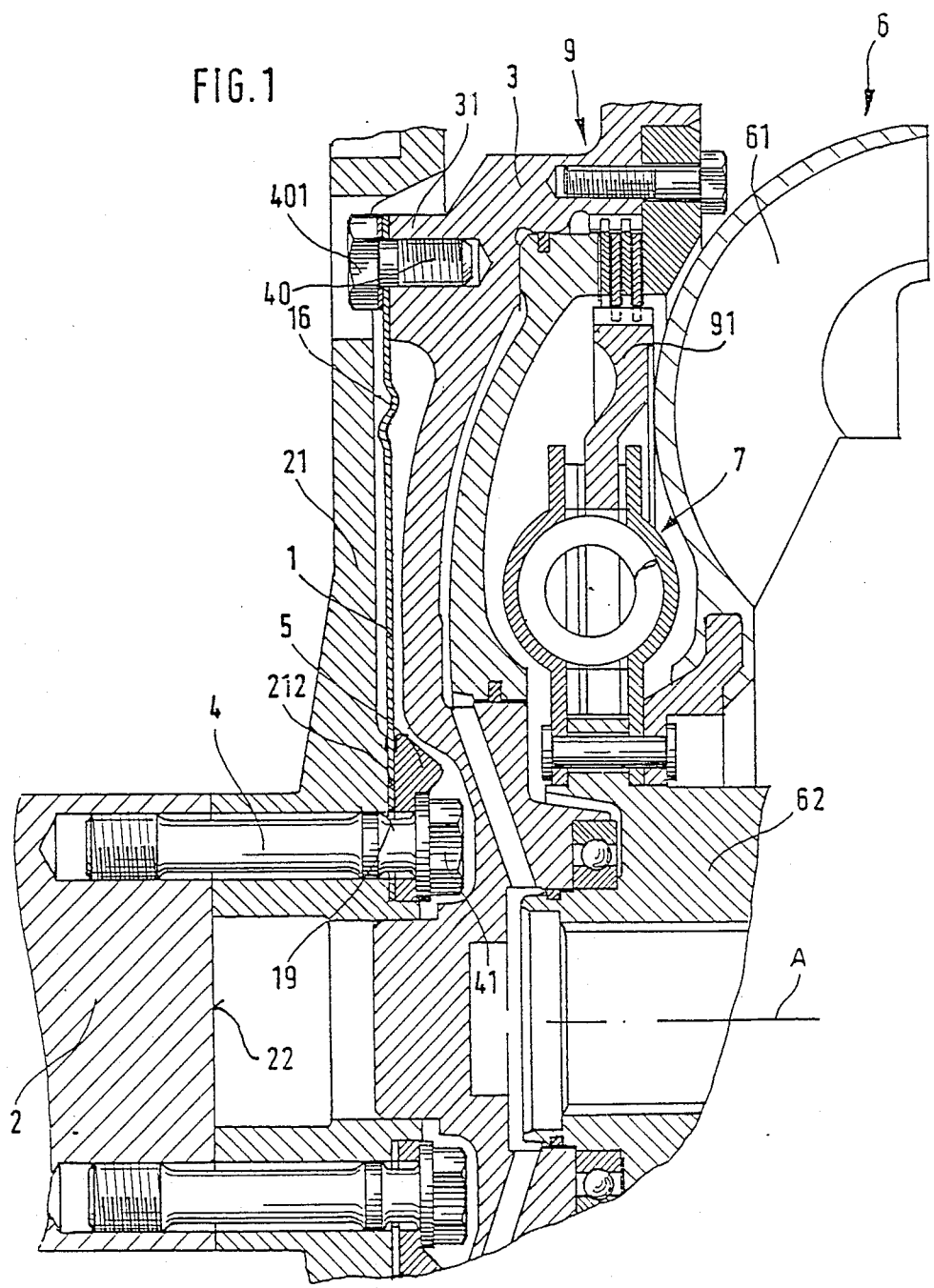
FIG. 1 is an axial section through the coupling-disk area of a drive system according to this invention.

As seen in FIG. 1 a drive system according to this invention is centered on an axis A and comprises an engine drive shaft 2 having an end face 22 extending perpendicular to the axis A and carrying a flywheel 21. A drive train has a torque converter 6 having a turbine 61 whose shaft 62 is connected via torque dampers 7 with a clutch disk 91 of a clutch 9 connected to an input member 3 also centered on the axis A. These parts are all substantially standard.

Figure 2:
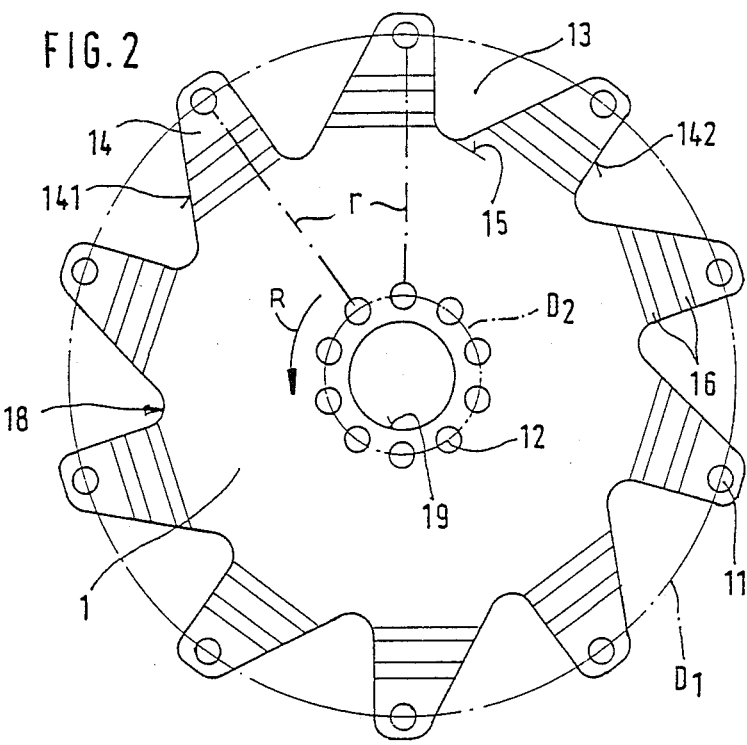
FIG. 2 is an axial end view in small scale of the stellate disk according to this invention.

According to this invention and as also shown in FIG. 2 the output element 21 and input element 3 are interconnected by a stellate disk 1 formed of one or more layers of spring steel and having an outer ring $D_1$ of angularly equispaced holes or bore 11 and an inner ring $D_2$ of angularly equispaced bores 12 lying just outside a central hole 19 formed in the disk 1. The disk 1 is formed with tabs 14 each formed with one of the holes 11 and separated by outwardly open triangular cutouts 13 terminating inward at locations 15 spaced about two thirds of the way from the inner ring $D_2$ to the outer ring $D_1$. These tabs 14 taper outward and have, relative to the normal direction R of rotation of the elements 2 and 3 about the axis A, leading edges or flanks 141 that form acute angles with respective radii r extending from each inner bore 12 to the respective outer bore 11 and rear edges or flanks 142 extending parallel to the respective radii R.

The disk 1 is clamped to a rearwardly directed annular surface 212 of the flywheel 21 by means of bolts 4 whose heads 41 press a ring 5 against the rear face of the inner periphery of the disk 1. The input element 3 is formed at each hole 11 with a forwardly projecting boss 31 to which the respective tab 14 is secured by a bolt 40 whose head 401 bears axially backward via a washer on the tab 14.

In addition each tab 14 is formed with tangentially extending corrugations 16 so that the axes on which the shafts 2 and 62 are centered can become somewhat offset from each other with extension of the corrugations 16 on one side of the disk 1, compression of the opposite corrugations 16, and some twisting of the tabs 14 on the disk therebetween. The bolts 4 and 40 secure the respective disk portions to the respective element 21 and 3 against any relative displacement.

Figure 3:
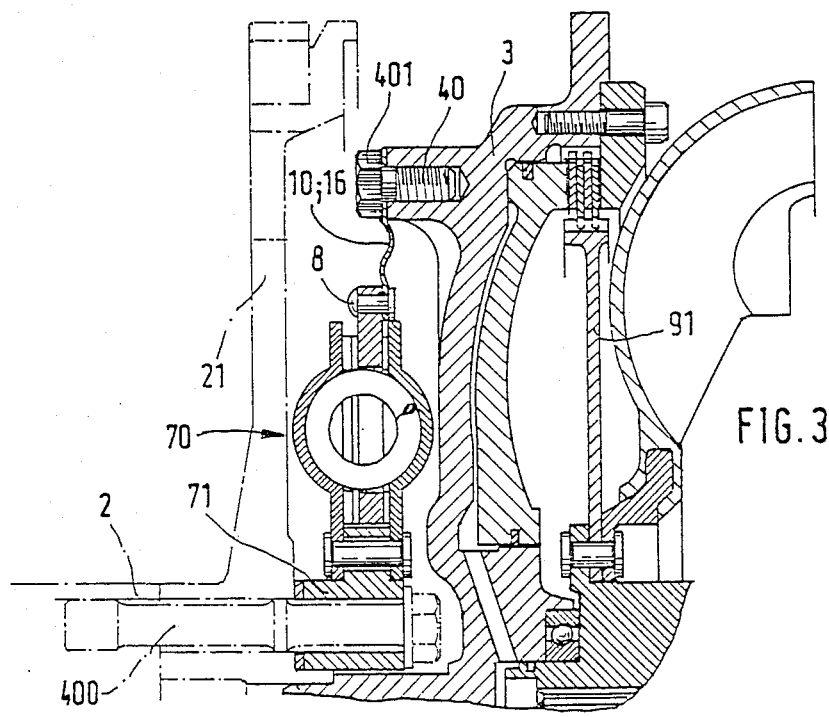
FIG. 3 is a small-scale view like FIG. 1 but showing an alternative form of this invention.

FIG. 3 shows an arrangement wherein torque dampers 70 are placed between the inner periphery of a coupling disk 10 similar to the disk 1. Here the dampers 70 have an inner ring 2 secured by bolts 400 to the shaft 2 and/or the flywheel 21 and the disk 91 of the clutch 9 is one piece. Such a torque damper can be seen in U.S. Pat. No. 4,353,444 of Bionaz.

With the system of this invention the input and output elements can move axially and radially relative to each other and their axes can move out of perfect alignment, with substantially no loss in torque. All such movement is accompanied by elastic nondestructive deformation of the disk 1 or 10.

We claim:

1. In a drive system having
    an engine with an output element rotatable about an axis,
    a drive train having an input element rotatable generally about the same axis, and
    a coupling disk having an inner ring of bores by means of which it is bolted to the output element and an outer ring of bores by means of which it is bolted to the input element, the improvements wherein
    the disk is formed with a plurality of radially outwardly projecting and radially outwardly tapering generally sawtooth tabs separated by radially outwardly open, generally triangular, and radially inwardly tapering cutouts and each formed with a respective one of the outer bores, the cutouts extending radially inward past regions of contact between the tabs and the input element, the tabs each being formed with generally tangentially extending corrugations and each having a leading flank and a trailing flank relative to a normal direction of rotation of the elements about the axis, each leading flank extending at an acute angle to a centerline of the respective tab and each trailing flank extending generally parallel to the respective centerline.

2. The improved drive system defined in claim 1 wherein the corrugations are straight and extend substantially perpendicular to respective radii extending from the axis through the respective outer bores.

3. The improved drive system defined in claim 1 wherein there are the same number of inner bores as outside bores and the bores are angularly equispaced about the axis.

4. The improved drive system defined in claim 1 wherein each cutout extends outward from a location generally two-thirds of the distance from a circle on which lie the inner bores to a circle on which lie the outer bores.

5. The improved drive system defined in claim 1 wherein one of the elements includes a torque damper.

6. The improved drive system defined in claim 5 wherein the torque damper is part of the output element.

* * * * *